US008573291B2

(12) United States Patent
Vick

(10) Patent No.: US 8,573,291 B2
(45) Date of Patent: Nov. 5, 2013

(54) COMPACT RADIAL COUNTERFLOW RECUPERATOR

(75) Inventor: Michael J. Vick, Vienna, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 795 days.

(21) Appl. No.: 12/784,986

(22) Filed: May 21, 2010

(65) Prior Publication Data

US 2010/0293946 A1 Nov. 25, 2010

Related U.S. Application Data

(60) Provisional application No. 61/180,480, filed on May 22, 2009.

(51) Int. Cl.
F28F 3/00 (2006.01)
F02C 7/10 (2006.01)

(52) U.S. Cl.
USPC .......................................... 165/166; 60/39.511

(58) Field of Classification Search
USPC ................... 60/39.511, 39.512; 165/166, 167
See application file for complete search history.

(56) References Cited

U.S. PATENT DOCUMENTS 3,905,723 A * 9/1975 Torti, Jr. ..................... 416/241 R
4,017,347 A * 4/1977 Cleveland .................. 156/89.27
4,027,729 A 6/1977 Bruhl
4,298,059 A 11/1981 Krauth et al.
4,347,896 A * 9/1982 Rosman et al. ............... 165/166
4,369,029 A 1/1983 Forster et al.
4,488,920 A 12/1984 Danis
4,582,126 A 4/1986 Corey
4,993,223 A * 2/1991 Kretzinger ................. 60/39.511
5,388,398 A 2/1995 Kadambi et al.
6,016,865 A 1/2000 Blomgren
6,293,338 B1 9/2001 Chapman et al.
6,364,007 B1 4/2002 Fischer
6,711,889 B2 3/2004 Kuo et al.
7,147,050 B2 12/2006 Kang et al.
2001/0006103 A1 * 7/2001 Nash et al. ..................... 165/153
2005/0279080 A1 * 12/2005 Costen et al. .............. 60/39.511

OTHER PUBLICATIONS

International Search Report and Written Opinion for PCT/US10/35781.
McDonald, C.F., "Recuperator Considerations for Future Higher Efficiency Microturbines", Applied Thermal Engineering 23, 2003, pp. 1463-1487.

(Continued)

Primary Examiner — Gerald L Sung
(74) Attorney, Agent, or Firm — US Naval Research Laboratory; Kerry L. Broome

(57) ABSTRACT

An annular design heat exchanger is formed from an arrangement of wedge-shaped stacks of wafers. Each wafer includes sheets of material separated by peripheral and supporting walls that define interior flow channels through which a first fluid can flow. Holes in the sheets provide inlets and outlets to the channels, and walls surrounding the holes mate with neighboring wafers in the stack, forming integral inlet and outlet manifolds, while ensuring uniform spacing between the wafers. A second fluid can flow around the manifolds and through the spaces between the wafers in a counterflow pattern. In the annular assembly, the manifolds are oriented substantially axially, and the flow channels are oriented substantially radially. The heat exchanger can be formed from a ceramic material, and can be incorporated into an engine assembly or a heat-recirculating combustor.

21 Claims, 6 Drawing Sheets

(56) References Cited

OTHER PUBLICATIONS

Weinberg, F.J., "Combustion Temperatures: the Future?", Nature, vol. 233, 1971, pp. 239-241.

Lloyd, S.A., and Weinberg, F.J., "A Burner for Mixtures of Very Low Heat Content", Nature, vol. 251, 1974, pp. 47-49.

Lloyd, S.A., and Weinberg, F.J., "Limits to Energy Release and Utilisation from Chemical Fuels", Nature, vol. 257, 1975, pp. 367-370.

Jones, A.R., Lloyd, S.A., and Weinberg, F.J., "Combustion in Heat Exchangers", Proceedings of the Royal Society of London, vol. 360 A, 1978, pp. 98-115.

Ronney, P. D., "Analysis of Non-Adiabatic Heat-Recirculating Combustors", Combustion and Flame, vol. 135, pp. 421-439, 2003.

Gonzalez, J.M., Ferri, J.L., and Rebello, W.J., "Industrial Operating Experience of the GTE Ceramic Recuperator", Oak Ridge National Laboratory, Oak Ridge TN, Jun. 1990.

McDonald, C.F., and Rodgers, C., "Small Recuperated Ceramic Microturbine Demonstrator Concept", Applied Thermal Engineering 28, 2008, pp. 60-74.

Wilson, D.G., and Korakianitis, T., The Design of High-Efficiency Turbomachinery and Gas Turbines, Upper Saddle River, NJ: Prentice-Hall, 1998, pp. 562-563.

Wilson, D.G., and Ballou, J.M., "Design and Performance of a High-Temperature Regenerator Having Very High Effectiveness, Low Leakage, and Negligible Seal Wear", GT2006-90095, ASME Turbo Expo 2006, Barcelona, Spain, American Society of Mechanical Engineers, 2006.

Wilson, M.A., Recknagle, K., and Brooks, K., "Design and Development of a Low-Cost, High Temperature Silicon Carbide Micro-Channel Recuperator", GT2005-69143, ASME Turbo Expo 2005, Reno NV, American Society of Mechanical Engineers, 2005.

Ferrato, M., and Martinez, G., "Ceramic Heat Exchanger Development by Boostec SA", p. 211-227 in Ceramic Gas Turbine Component Development and Characterization by Mark Van Roode, Mattison K. Ferber, and D.W. Richerson, ASME, New York, 2003.

\* cited by examiner

COMPACT RADIAL COUNTERFLOW RECUPERATOR

CROSS-REFERENCE TO RELATED APPLICATIONS

This application claims priority to provisional patent application entitled, "Compact Ultra-Lean Premixed Recuperated Combustor," filed on May 22, 2009, and assigned U.S. Application No. 61/180,480; the entire contents of which are hereby incorporated by reference.

FIELD OF THE INVENTION

The invention relates generally to compact, high temperature gas-to-gas heat exchangers. More specifically, the invention relates to a radial counterflow recuperator, a type of heat exchanger, which is particularly suitable for waste heat recovery in a gas turbine engine.

BACKGROUND

Most gas turbines in service today are of the "simple cycle" type, which means they typically consist of only a compressor, a combustor (burner), and a turbine. In simple cycle engines, the exhaust leaving the turbine is still very hot. This rejection of unused heat to the atmosphere represents a waste of energy. For this reason, some gas turbines employ a heat exchanger, such as a recuperator or regenerator, to recover waste heat from the turbine exhaust. This heat can be used to preheat the air leaving the compressor, before it enters the burner. Thus, less fuel is needed to heat up the air to its target temperature, making the engine more efficient. Recuperated and regenerated engines are common and well known to those skilled in the art.

However, despite their advantages, recuperators are rarely used in gas turbines due to their cost and weight. Current recuperators typically use expensive metal alloys with high temperature oxidation and creep rates that limit their use to certain maximum temperatures. Other current recuperators use stainless steel, which is cheaper than some other metal alloys but has an even lower temperature limit. In some instances, to overcome these temperature limits, ceramic recuperators have been used. However, prior art ceramic recuperator designs have typically suffered from one or more of the following weaknesses: 1) relatively large size and weight; 2) a box-shaped design that can require complex ducting of the gases; 3) the need for a large amount of insulation, both around the inlet/outlet ducting and surrounding the hot parts of the heat exchanger itself, to prevent excessive heat losses; 4) insufficient accommodation for thermal stresses; and 5) fabrication from ceramic materials with problematic attributes.

Common materials used in ceramic recuperators have been magnesium aluminum silicate (cordierite), lithium aluminum silicate (LAS), silicon carbide, and silicon nitride. Cordierite and LAS can be advantageous due to their low cost and low thermal expansion coefficients; however, they have relatively low strength and low fracture toughness. Worse, the magnesium and lithium in these materials are prone to corrosion by compounds in the exhaust, resulting in short service lives. Silicon carbide is typically stronger and more corrosion-resistant, but still not very tough, and can be corroded by water vapor in the exhaust if the concentration is high enough. In addition, silicon carbide has a very high thermal conductivity, which increases heat conduction in undesirable directions and thus reduces the heat exchanger effectiveness. (Heat exchangers typically have very thin walls, which impose little resistance to heat transfer in the desired through-thickness direction, regardless of the wall conductivity.) Finally, silicon nitride can be strong, tough, and only moderately conductive; however, it has not been used on a widespread basis because it is very expensive, due to both the raw material cost and the expensive manufacturing processes needed to produce finished parts. Secondarily, silicon nitride, like silicon carbide, is prone to erosion by water vapor in the exhaust.

In the prior art, regenerators have been made from ceramic materials and used in gas turbines for many decades. In general, a recuperator is a heat exchanger with manifolds that distribute gases to alternating air channels, as opposed to a regenerator, which is a periodic flow device that exposes a heat storage medium such as a ceramic honeycomb to alternating flows of compressed air and turbine exhaust. Typically, recuperators are stationary devices that are mechanically simpler, but geometrically more complex, than regenerators are.

Regenerators are straightforward to manufacture because they typically employ rotating disks that are simple honeycomb-like ceramic extrusions. The disk rotates past seals, so that one side is exposed to a duct of exhaust gases flowing through axially in one direction, which cool down as they flow through. The other side is typically exposed to an air duct flowing through in the other direction, which heats up as it flows. The ceramic matrix assumes a relatively stable temperature gradient, in much the same way as a counterflow heat exchanger. Regenerators can have very small internal channels; and, as a direct result, their effectiveness can be very high relative to the size and weight of the ceramic component. However, the typical problem with regenerators is that there are moving parts and sliding seals, both of which have to operate at high temperatures. The moving parts complicate the system, reducing reliability due to the wear of the moving parts. In addition, although the ceramic matrix itself is lightweight for a given effectiveness, the associated mechanical components, ducts, seals, and insulation substantially increase the weight and volume of the system. Finally, regenerators have typically been made from cordierite or LAS, and thus have suffered the same corrosion and durability problems mentioned above. For these reasons, a fixed-surface compact radial counterflow recuperator design is preferred wherever feasible and practical. It is only the fact that no ceramic recuperator is available with equally tiny internal channels, consequently high effectiveness per unit weight, and yet low manufacturing cost, that explains why regenerators are still commercially competitive.

In summary, prior art heat exchangers are typically disadvantageous in size and weight, and are typically made from materials that are undesirably expensive, temperature-limited, prone to corrosion, weak, or insufficiently tough. Furthermore, the heat exchangers typically suffer from pressure and heat losses and are prone to thermal stresses that can cause reliability issues. Accordingly, there remains a need in the art for a heat exchanger that can overcome these and other limitations.

SUMMARY OF THE INVENTION

The invention satisfies the above-described and other needs by providing for a higher-effectiveness compact heat exchanger that can be manufactured inexpensively from materials that are cheaper, less dense, lighter, and can withstand higher temperatures than metal alloys. Additionally, the heat exchanger can include features that reduce thermal stresses, a major cause of leaks in high-temperature heat exchangers.

According to one aspect of the invention, a heat exchanger can include a plurality of wafers. Each wafer can be formed by two or more sheets of material and include peripheral walls between the sheets. In one embodiment, the material can be a ceramic material, such as mullite. The peripheral walls can define one or more interior flow channels between the sheets and an exterior portion outside the sheets. Furthermore, each wafer can include at least one hole at each end of the wafer that extends through the sheets, which can provide for inlet and outlet holes to the interior flow channels of each wafer. Additionally, each wafer can include walls surrounding the inlet and outlet holes positioned in the exterior portion outside the sheets. Taken together, the plurality of the wafers can be stacked into sectors with the inlet holes aligned and the outlet holes aligned forming manifolds. Finally, a plurality of the sectors can be arranged in an annular design, such that the manifolds are oriented substantially axially and the internal flow channels are oriented substantially radially.

For another aspect of the invention, an engine assembly can incorporate the heat exchanger described above. Specifically, the engine assembly includes a compressor that can be configured for compressing inlet air. Secondly, the heat exchanger can be configured to preheat the compressed inlet air. The preheated compressed inlet air can then enter a combustor, located in the center of the heat exchanger, which can be configured to receive the preheated compressed air and an injected fuel from one or more fuel injectors. The fuel injectors can be located downstream from the heat exchanger. The combustor can allow the combustion of the injected fuel to occur, and the products of combustion can be used to perform useful work by expansion through a turbine, or other expansion means. The exhaust can then flow back through the heat exchanger, which can use the waste heat from the turbine exhaust to provide the energy needed to preheat the incoming compressed inlet air.

For another aspect of the invention, a heat-recirculating combustor assembly can incorporate the heat exchanger described above. A source of air can be provided to a mixing volume, which can be configured to thoroughly mix the compressed inlet air with fuel injected by one or more fuel injectors, upstream from the heat exchanger. The heat exchanger described above can then be configured to preheat the fuel and air mixture and send it to a combustor. The combustor, located in the center of the heat exchanger, can receive the preheated the fuel and air mixture downstream of the heat exchanger and allow combustion to occur. The products of combustion can be utilized for a useful purpose, then collected and supplied back to the heat exchanger, which uses the waste heat from the used combustion products to provide the energy needed to preheat the incoming fuel and air mixture.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
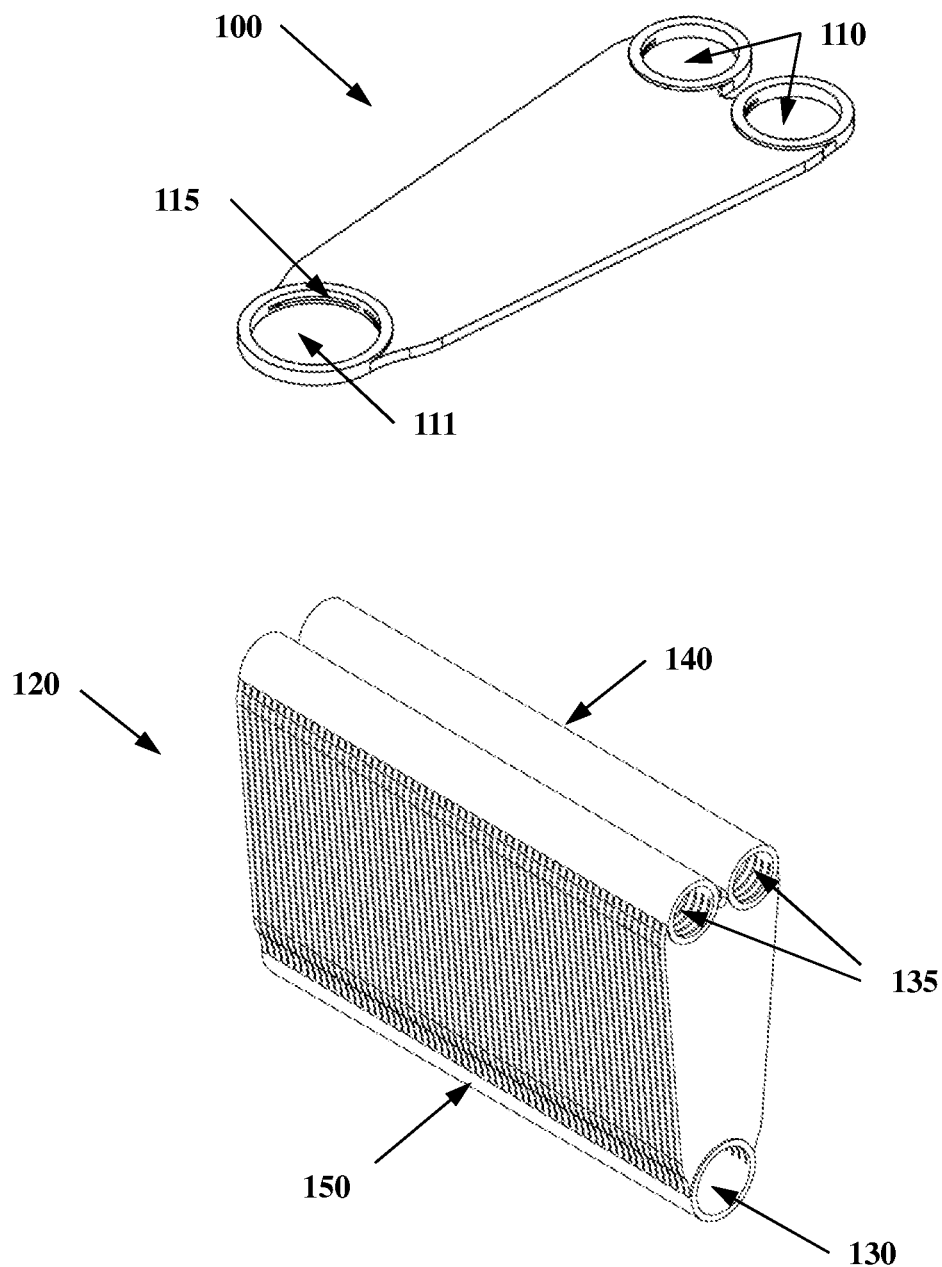
FIG. 1 is a schematic of heat exchanger components in accordance with an exemplary embodiment of the invention.

Referring now to the drawings, in which like numerals represent like elements, aspects of the exemplary embodiments will be described in connection with the drawing set.

To overcome the limitations of the prior art, a heat exchanger assembly for gas-to-gas heat transfer is described herein. The device, having been designed for use as a recuperator in a miniature gas turbine engine and being particularly suitable for that application, will be described in that context. However, it will be obvious to one of ordinary skill in the art that a heat exchanger of different size or proportions, but similar in all fundamental aspects, could be useful in a number of other applications; for example, industrial furnaces, high temperature chemical process reactors, other types of recuperated engines, and the like. Thus in the following description, one gas stream is described as "compressed air", in accordance with the gas turbine application, while the other stream is described as "exhaust". However, in another application of the heat exchanger, these gases could be other substances or mixtures, without changing the fundamental nature or operation of the heat exchanger. Similarly, in certain paragraphs below, mention is made of specific temperatures of the gases flowing through the heat exchangers, but in a different application, the streams could be at different temperatures without changing the intended function of the heat exchanger.

FIG. 1 is a schematic of recuperator components in accordance with an exemplary embodiment of the invention. The recuperator assembly includes many wafers, as represented by example wafer 100. The wafers 100 can be formed by two or more sheets, or layers, of ceramic material. One example process for forming the wafers from the ceramic materials is to laser-cut unfired sheets of thin tape-cast ceramic material, laminate the sheets together, and then co-sinter the laminated sheets to form a monolithic part. The monolithic part can be a wafer 100 or a complete stack of wafers 120. For example, in an exemplary embodiment of the invention, this technique can be utilized to build a recuperator from 0.25-mm thick tapecast material.

In an alternative process, the wafers 100 can be injection-molded from ceramic powder mixed with plastic binder. Other low-cost production techniques can also be utilized.

In an exemplary embodiment of the invention, mullite, a low-cost ceramic comprising only silica and alumina (without the magnesium or lithium oxides present in cordierite and LAS respectively), can be a preferred choice for the recuperator material. Mullite can have several advantages over other types of ceramic materials. First, it is well known that mullite can be toughened by incorporating certain additives, such as mullite whiskers or yttria-stabilized zirconia. Second, mullite is advantageous in comparison with non-oxide ceramics such as silicon carbide (SiC), which can undergo a reaction with oxygen and water vapor at high temperature that slowly erodes it away. Being an oxide already, mullite cannot be oxidized any further, and thus is resistant to oxidation-induced erosion. As discussed above, another material that can be utilized is cordierite (magnesium aluminum silicate, MgO—$Al_2O_3$—$SiO_2$ in certain proportions). Cordierite can be advantageous because it has a low thermal expansion coefficient, it is cheap, and it is an oxide, so it is fairly resistant to oxidation in general. However, cordierite can be corroded by alkaline compounds in the gas exhaust. Replacing cordierite with mullite, a very similar aluminosilicate that is comprised of $Al_2O_3$ and $SiO_2$ only and contains no MgO, can solve the corrosion problem because the MgO in the cordierite is what reacts with the corrosive exhaust species. The same applies to lithium aluminum silicate, or LAS, but the reactive species in that case is $LiO_2$.

As represented in FIG. 1, each wafer 100 can include one or more holes 110 and 111. Additionally, each wafer 100 can include one or more radial channels 115, to conduct a gas, such as an exhaust gas, through the interior portion of the wafer. Complete sectors 120, or "segments" or "wedges," of the heat exchanger can be formed by stacking multiple wafers 100. The stacking can be done immediately after the wafers are formed in an un-fired ("green") state, and then the entire stack can be sintered in a furnace to remove the binders and sinter the ceramic to full density. Alternatively, the wafers can be fired in a furnace individually, and then, in a second step, they can be stacked, bonded together, and sintered again. In a third alternative process, a ceramic adhesive may be used to join the wafers, or some other method. Among all these methods, the first—co-sintering a complete stack in one step—is preferred because it reduces the number of steps needed to make the sector, as well as the amount of time spent in the furnace.

Surrounding the holes 110 and 111 of each wafer 100 can be thickened ridges or walls, which can protrude perpendicularly from the wafers 100 to seal the holes 110 and 111, creating separate spaces for fluid streams when stacked, so that the two streams cannot mix. More specifically, the separate spaces can include one or more interior fluid flow channels and one or more exterior fluid flow channels. The fluid flow channels can include exhaust channels and air channels. The walls can also serve the purpose of maintaining the desired separation distance between each pair of wafers 100.

As the holes 110 and 111 of each wafer 100 in the stack are aligned, they can form a single integral manifold 130 at the inner 150 radial position and two integral manifolds 135 at the outer 140 radial positions of each sector 120. More or fewer manifolds can also be formed in alternative embodiments. In an exemplary embodiment of the invention, the inner manifold 130 can be 8 mm ID, and the outer manifolds 135 can be 6 mm ID. Other dimensions can also be utilized for the manifolds. In accordance with an exemplary embodiment of the invention, the integrally formed inlet manifold 130 and outlet manifolds 135 can be positioned conveniently for integration into the exhaust flow path in a gas turbine engine.

Figure 2:
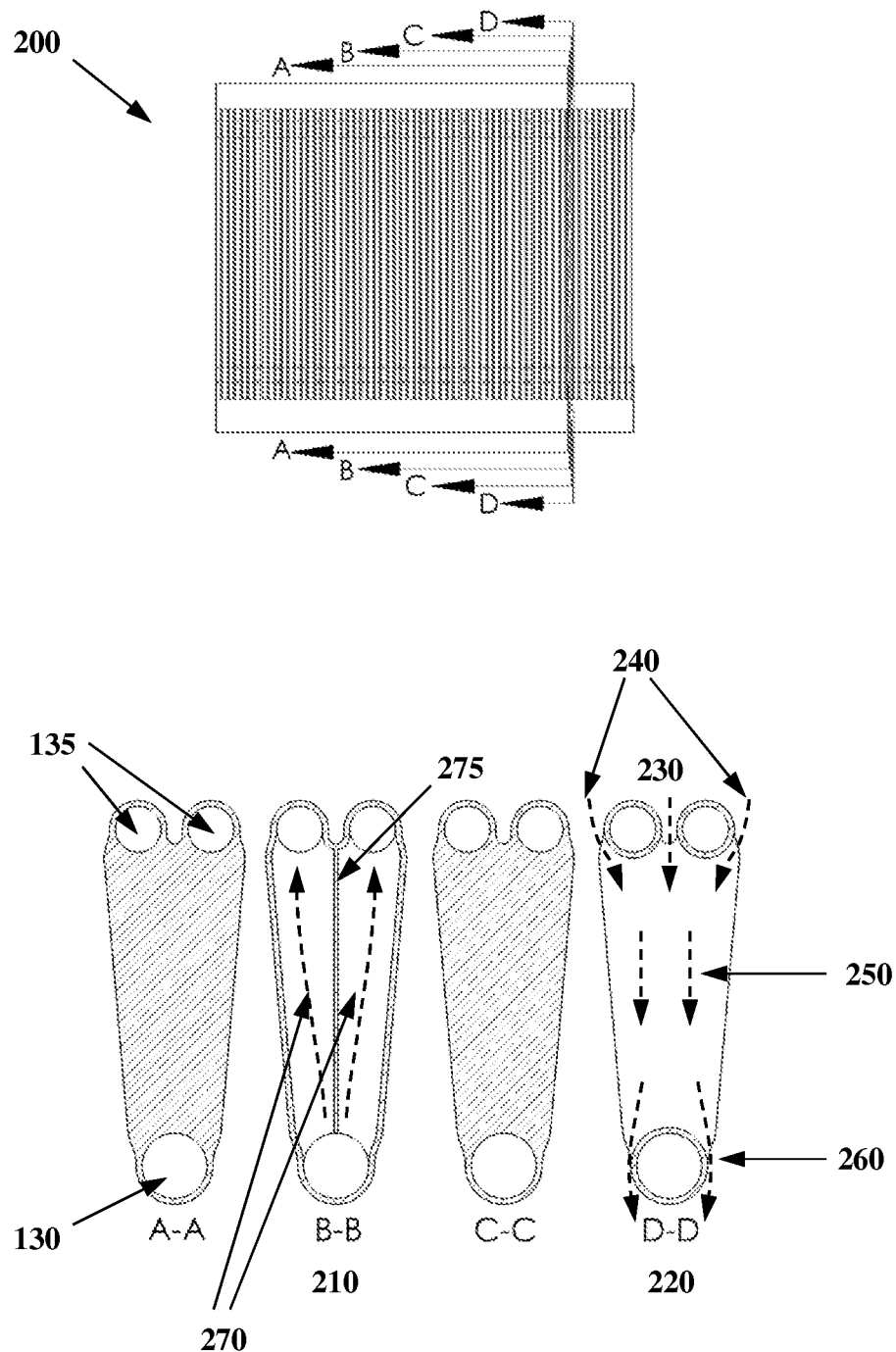
FIG. 2 is a cross-sectional view of a sector depicting the channels in accordance with an exemplary embodiment of the invention.

FIG. 2 is a cross-sectional view of a sector depicting the radial channels in accordance with an exemplary embodiment of the invention. A single sector 200 is shown with cross-sections A-A, B-B, C-C, and D-D represented, all taken from a single wafer 100 in the stack. The cross-sections of each layer are displayed individually at the bottom of FIG. 2, and represent the flow pattern of exhaust gases and air through the channels. For each cross-section, the upper holes represent the outer manifolds 135 and the bottom hole represents the inner manifold 130.

As represented in cross-section D-D 220, compressed air can enter the recuperator flowing in the inward radial direction from the outer portion 140 of the sector towards the inner portion 150 (as represented by the three arrows 230 and 240). The compressed air can flow through the spaces between the two outer manifolds 135 (as represented by arrow 230) and at the outer periphery (as represented by arrows 240). This space, or exterior fluid flow channel, can be used by flow streams, such as the compressed air, to flow through. The compressed air can continue to flow radially inward (represented by arrows 250) through the air channel created by the space between wafers 100 of the recuperator sector 120. Finally, the compressed air can leave the recuperator sector 120 through spaces between inner manifold 130 at the interior portion 150 (represented by arrows 260), continuing to flow radially. As it exits the sector, the compressed air can be put at the center of an empty volume, which is located there for allowing sufficient residence time for combustion to complete.

Returning to FIG. 1, turbine exhaust can enter the recuperator sector 120 flowing in the axial direction through the end of the inlet manifold 130 at the inner portion 150 of the sector 120. From the inlet manifold 130, the exhaust can be partitioned into two or more radial channels 115 as shown in cross-section B-B 210 of FIG. 2, with partition wall 275. Cross-section B-B 210 represents two radial channels 115; however, in an alternative embodiment only one radial channel can be utilized. Essentially, the turbine exhaust can turn 90° to flow radially outward through internal fluid flow channels, or exhaust channels, (as represented by arrows 270). The turbine exhaust flows through these channels in the radial direction, and can then be collected in the outer manifolds 135 at the outer portion 140 of the recuperator sector 120. At the outer manifolds 135, the turbine exhaust can turn another 90° to leave the recuperator sector 120 by flowing in the axial direction out through the outer manifolds 135.

Therefore, in combination between the cross-sections B-B 210 and D-D 220 the hot exhaust gases and the compressed air each flow steadily in opposite directions through alternating radial channels, or passages, and no mixing occurs. However, the heat from the exhaust gases is continuously conducted through the walls of the layers to pre-heat the compressed air. Thus, when the compressed air reaches the inner portion 150 it is substantially heated up from when it entered the outer portion 140. Furthermore, hot exhaust that initially enters the inlet manifold 130 loses a significant portion of its temperature as it radially flows out through the exhaust channel of the wafer 100 towards the outer manifolds 135. Thus, the temperature of the fluid streams entering and exiting the heat exchanger near the outer radius of the sector is lower than the temperature of the fluid streams entering and exiting at the inner radius of the sector; or, more specifically, the temperature of the fluid stream flowing in the radially outward direction is generally decreasing, and the temperature of the fluid stream flowing in the radially inward direction is generally increasing. In an exemplary embodiment of the invention, the exhaust channel and air channel dimensions can be extremely small, which can inherently lead to high effectiveness, light weight, and low pressure losses.

Referring again to FIG. 2, section B-B 210, it can be seen that there is an outer wall at the periphery of the exhaust channels 115, which can seal the exhaust inside and prevent the exhaust from mixing with the compressed air, as noted above. Additionally, there can be a partition wall 275 that is not required for this sealing function. The optional partition wall 275 can serve the purpose of holding the bottom wall of the channel (section A-A) and the top wall (C-C) apart. This can be important during operation when compressed air at a higher pressure is flowing through the air channel in cross-section D-D 220 and trying to collapse the exhaust channels in cross-section B-B 210, where the exhaust gases are flowing at considerably lower pressure. In an exemplary embodiment, these pressures are approximately two atmospheres absolute and one atmosphere absolute, respectively, creating a pressure differential of one atmosphere that can load walls A-A and C-C in a way that can collapse exhaust channels B-B. It may be noted that more than one partition wall 275 can be provided in the exhaust channels B-B for this purpose.

In an alternative exemplary embodiment of the invention, these pressure-resisting features need not be provided at all, if walls A-A and C-C are strong enough to resist the pressure on their own, supported only by the peripheral sealing walls. A second alternative would be for the pressure-resisting features not to be shaped as long, thin walls, but instead to be some other shape, such as round, oblong, etc. These pressure-resisting walls, pillars, or standoffs, could be spaced evenly throughout channels B-B. An additional benefit of these internal walls or pillars is that they can also resist "slumping" of walls A-A and C-C during the sintering process, when the heat exchanger is being built. During that process, there is no pressure differential across walls A-A and C-C, but gravity and other forces tend to cause thin flat surfaces to "slump" or bend as the high-temperature sintering process is being completed. The pressure-resisting walls minimize this. In a preferred embodiment, the minimum number of these walls or pillars would be provided—just enough to resist pressure stresses during operation, and slumping during sintering, but no more, because these features obstruct the exhaust flow slightly and thus generate additional pressure losses.

In summary, the heat exchanger includes a plurality of wafers, whereby each wafer can be formed by two or more sheets of material, such as the ceramic material, mullite, and with peripheral walls between the sheets. The peripheral walls can define one or more interior flow channels between the sheets and an exterior portion outside the sheets. The exterior portion outside the sheets can define one or more exterior flow channels. The interior flow channels and exterior flow channels can both be configured to allow fluids to flow through them. For example, the fluids can be air, such as inlet compressed air, and gases, such as hot exhaust gases. Other types of fluids can also flow through the channels.

Each wafer can include at least one hole at each end of the wafer that extends through the sheets, which can provide for inlet and outlet holes to the interior flow channels of each wafer. Additionally, each wafer can include walls surrounding the inlet and outlet holes positioned in the exterior portion outside the sheets. Taken together, the plurality of the wafers can be stacked into sectors, or segments, with the inlet holes aligned and the outlet holes aligned forming manifolds. Finally, a plurality of the sectors can be arranged in a segmented annular design, such that the manifolds are oriented substantially axially and the internal flow channels are oriented substantially radially.

Figure 3A:
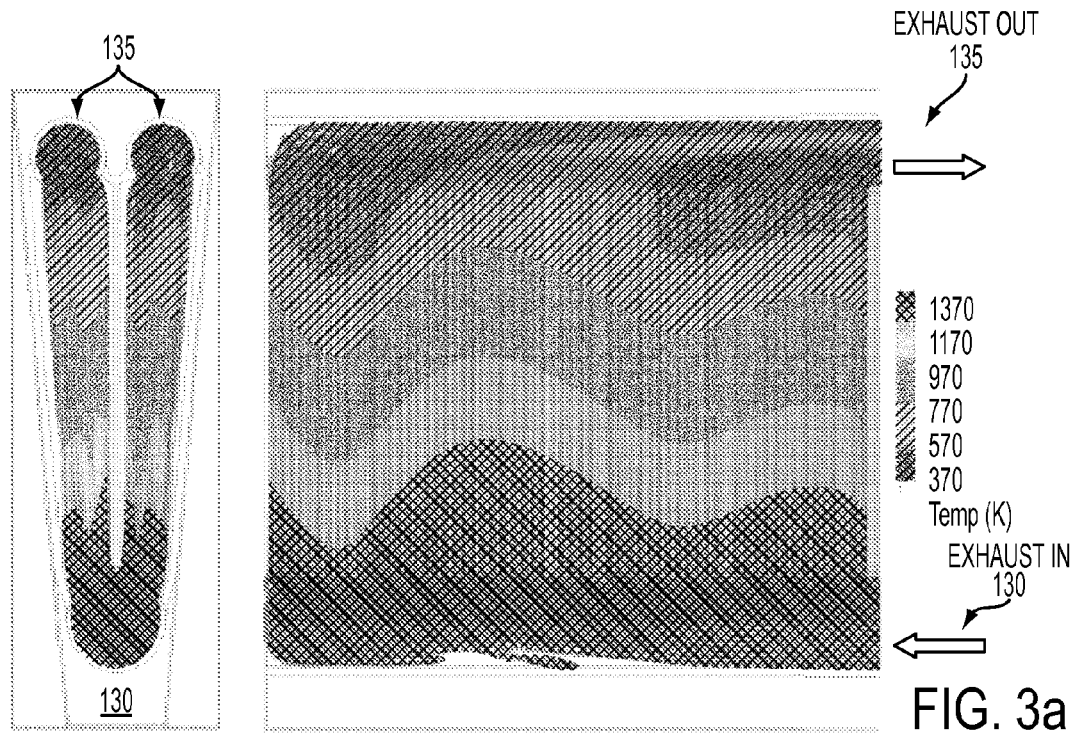
FIG. 3 represents thermal analysis results for exhaust and air flow through a recuperator in accordance with an exemplary embodiment of the invention.
Figure 3B:
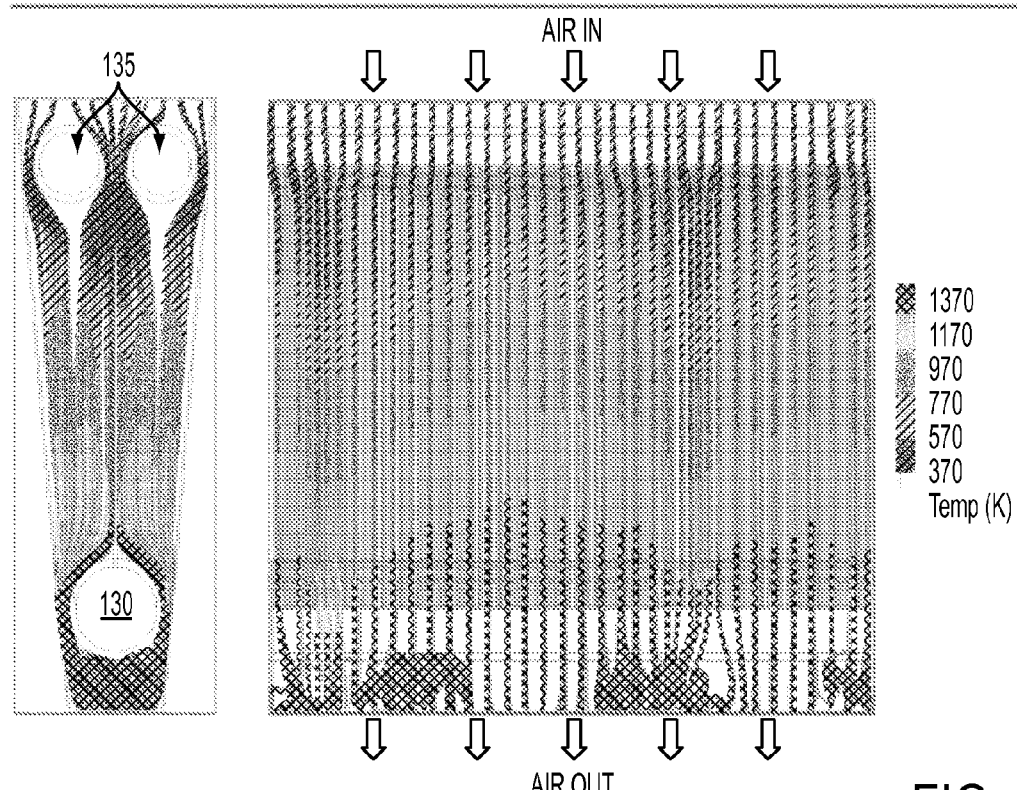

FIG. 3 represents thermal analysis results for exhaust and air flow through a recuperator in accordance with an exemplary embodiment of the invention. Two perspectives, a profile perspective of a recuperator sector 120 and a cross-section of a single wafer 100, are represented. Though somewhat difficult to visualize because of the lack of color, the scale on the right side of the exhaust flow in FIG. 3*a* and the air flow in FIG. 3*b* represent the local temperatures of these gases in Kelvin (K). On the color scale, the highest temperatures of 1370 K and higher, are represented by a dark red color at the top of the scale, and the lowest temperatures of 370 K, and lower, are represented by a violet color at the bottom of the scale. Different colors on the color spectrum range from red to orange to yellow to green to blue to indigo to violet, representing the drop in temperature in the range from 1370 K to 370 K. One of ordinary skill in the art will understand that the temperature range of 370 K-1370 K is just an example, and other temperature ranges can be expected.

FIG. 3*a* represents the thermal analysis results from the exhaust flow. Similar to the description associated with FIG. 2, exhaust enters the recuperator sector 120 flowing in the axial direction through the end of the inlet manifold 130. At this stage, the exhaust temperature can be extremely high, approximately 1300 K in this example. From the inlet manifold 130, the exhaust flows through one or more radial channels 115. Through this stage, the heat of the exhaust is conducted through the walls and the exhaust gases rapidly lose temperature, dropping towards the lower temperatures of around 500 K in this example. Finally, the exhaust gases are collected in the outlet manifolds 135 to flow out of the recuperator sector 120 in an axial direction.

FIG. 3*b* represents the thermal analysis results from the compressed air flow. Similar to the description associated with FIG. 2, compressed air can enter the recuperator sector 120 by flowing in the radial direction through the spaces around the outer manifolds 135. At this stage, the compressed air may be at a relatively low temperature, approximately 400 K in this example. The compressed air continues to flow radially inward through the radial air channel created by the space between wafers 100. Through this air channel, the compressed air is heated by the exhaust gas heat that is conducted through the walls of the wafer 100. Finally, the compressed air can leave the recuperator sector 120 through spaces around the inlet manifold 130, at which point it has been pre-heated to a relatively high temperature, approximately 1200 K in this example.

As the compressed air radially flows out of the recuperator sector 120 it can enter an empty volume in which it is collected for use in a subsequent process. For example, in a gas turbine application, the central empty volume can advantageously be used for combustion. In one embodiment, combustion could be stabilized by the presence of a typical combustor liner, well known to one of ordinary skill in the art. In an alternative embodiment, the central volume could be empty, and combustion could be stabilized simply by the hot surfaces and high air preheating temperatures created by the recuperator itself. Closer to the center, the turbine could be advantageously located.

As noted, the flow of the exhaust and compressed air through the wafers channels is predominantly radial. The radial flow allows heat from the hot areas at the inner portion 150 to be recycled and not wasted. More specifically, because both the hot exhaust inlet manifold 130 and incoming pre-heated compressed air are located in the inner portion 150 of each recuperator sector 120, heat that would ordinarily be radiated or conducted away from the hot areas can only go back into the recuperator sector 120, further heating the hot side, and hence the hot air coming in. This saves energy by, in effect, insulating the hot gas manifold 130 and other hot components, reducing heat losses to the environment, while also saving weight by reducing the amount of insulation needed.

Figure 4:
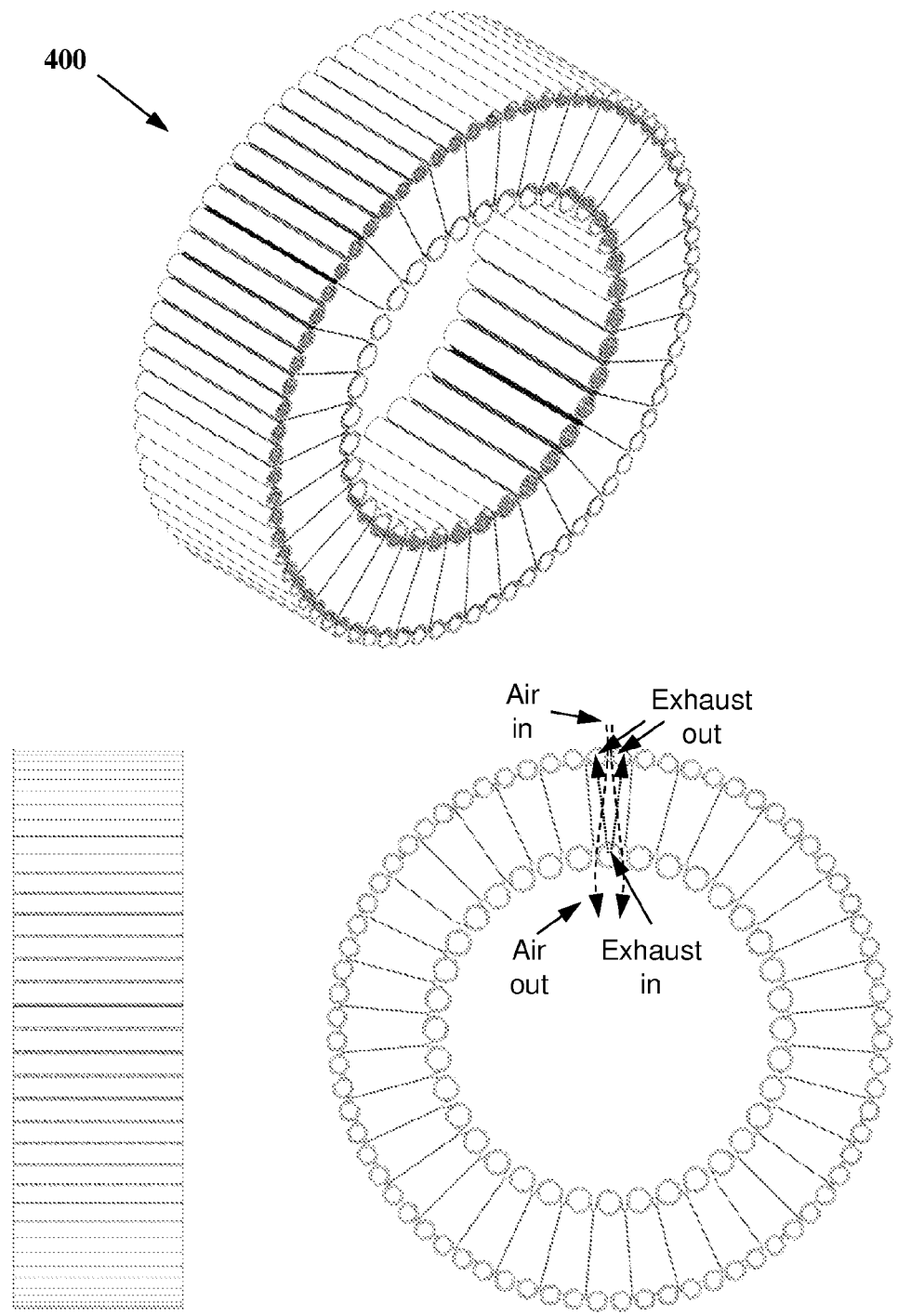
FIG. 4 is a schematic of a recuperator in accordance with an exemplary embodiment of the invention.

FIG. 4 is a schematic of different perspectives of a recuperator in accordance with an exemplary embodiment of the invention. To form the annular shaped recuperator 400, multiple sectors 120, or segments, can be arranged in the annular design. In an exemplary embodiment of the invention, thirty-six sectors can be utilized to form the segmented annular shaped recuperator; however, more or fewer sectors 120 can also be utilized. Designing the recuperator in an annular shape—as opposed to a rectangular, square, cube, or other shape—can be beneficial because the segmented annular shape recuperator can simply and elegantly plumb into a gas turbine engine, or other typically annular devices such as burners.

At both ends of each sector 120 can be a ceramic or ceramic matrix composite (CMC) plate, bonded to the sector 120. The plate on the inlet-outlet end must have holes positioned to match the inlets 130 and outlet 135 holes of each sector 120. The plate on the opposite end should be solid near the ends of the manifold tubes 130 and 135 to prevent compressed air from leaking into them. In areas not overlapping the manifold tube ends, both plates could optionally include thermal stress relieving features such as wrinkles, folds, radial cuts, or other flexible elements designed to allow a small amount of movement to accommodate thermal expansion. To withstand the high temperatures expected near the interior 150 of the annular recuperator 400 from the exhaust gases, a rigid ceramic adhesive can be used to bond each sector 120 to its end plates in that location. Both plates can be well insulated which can prevent substantial unwanted heat losses in the axial direction.

In the middle radial area of each sector 120, no bond is required; however, some type of bond could be used for additional support, providing that any bond in the middle radial area be arranged to impede the gas flow only minimally. Near the outer periphery 140, or cool side, of each sector 120, an adhesive can be used to bond each sector to the end plates. However, on this cool side 140, temperatures might remain cool enough to permit the use of a material with some compliance, but only moderate temperature capability, such as a rubber gasket or other elastomeric material, to bond the sectors 120 together. One example of this type of a flexible adhesive is a fluorosilicone sealant. The use of this type of material to bond the cool side 140 of the sectors 120 can mitigate thermal stresses that would otherwise occur due to a mismatch in expansion between the cool exterior 140 and the hot interior 150. More specifically, the elastomeric material, or a similarly substantially flexible material, can be used to make up at least some portion of the manifold walls.

Constructing the recuperator 400 in the exemplary segmented annular design can dramatically reduce thermal stresses. Other shape configurations, mentioned previously, typically develop large thermal stresses because of the temperature differences between the hot sides and cool sides, even if not restrained by any supports. As noted above, the use of an elastomeric material on the cool side 140 of the sectors 120 in the disclosed exemplary sector design is one way to mitigate thermal stresses. Additionally, each sector 120 in the present recuperator design can be longer radially than circumferentially, which also mitigates thermal stresses substantially. Furthermore, the segmented radial-flow annular design can lead to high "face area" (cross-sectional area perpendicular to the flow direction) and low streamwise path length. One of ordinary skill in the art will know that this is the ideal flow configuration for a compact counterflow heat exchanger. A cylinder can have much more surface area than a disk, if the available diameter is constrained.

In an exemplary embodiment of the invention, the entire recuperator can reside in a pressure vessel formed by an engine housing, so that compressed air can put pressure against the walls of the recuperator 400 from all sides. Essentially, the gas pressures are generally pushing from the outside in, trying to collapse the channels, rather than positioning high-pressure gases internally, trying to blow them apart. This pressure can load the ceramic material substantially in compression, which can help to suppress the growth of any cracks or leaks in the recuperator walls. More specifically, referring to FIG. 2, the walls in cross-section layers B-B and D-D are in compression, circumferentially, radially, and axially. However, the pressure actually loads the sheets in cross-section layers A-A and C-C in bending. Thus, this creates a positive pressure difference between the external portion of each wafer and the internal portion, loading the material predominantly in compression.

Figure 5:
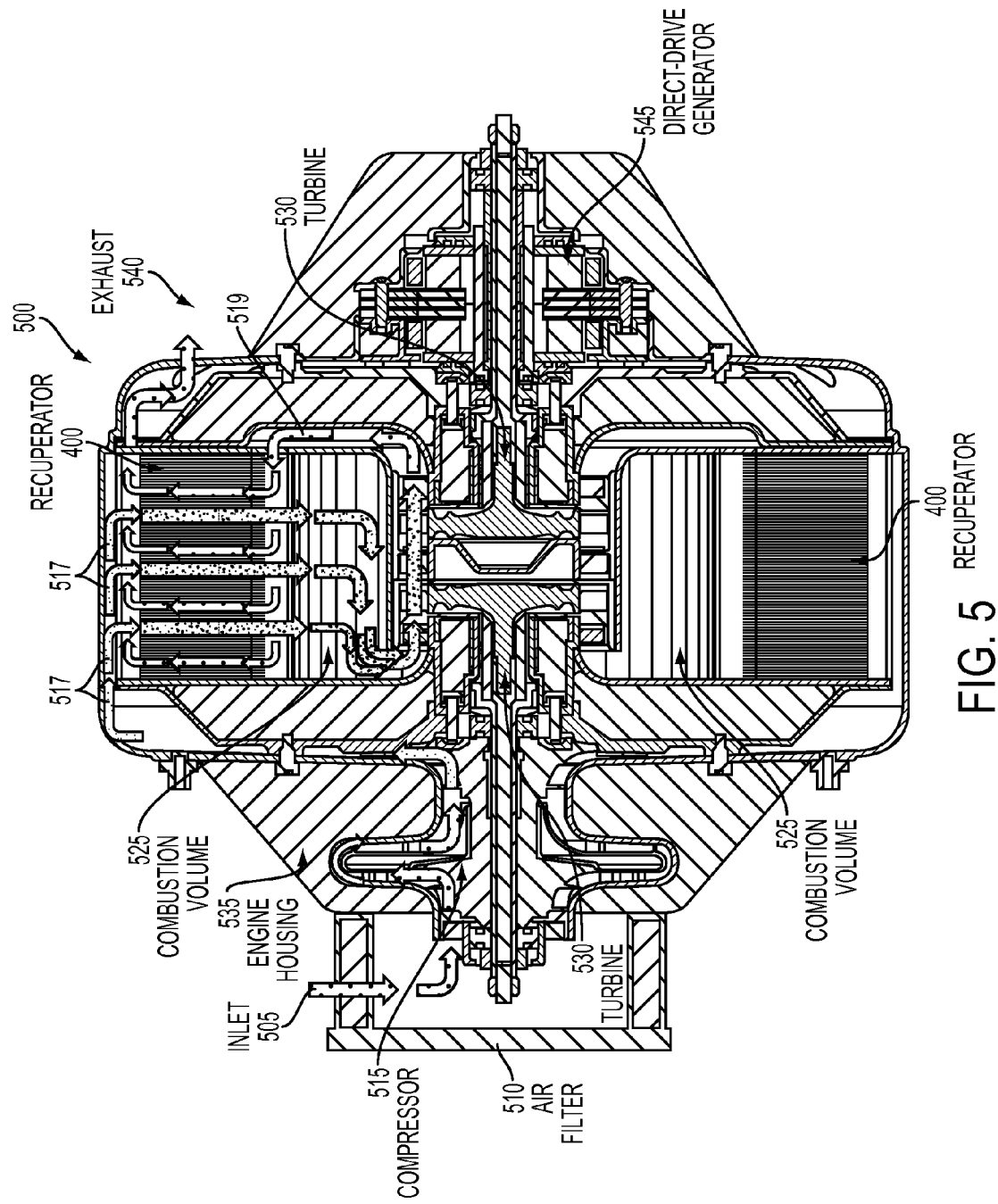
FIG. 5 is a schematic of an engine assembly incorporating the heat exchanger in accordance with an exemplary embodiment of the invention.

FIG. 5 is a schematic of an engine assembly 500 incorporating the heat exchanger 400 in accordance with an exemplary embodiment of the invention. This particular engine assembly 500 is a turbo shaft engine with a ceramic recuperator 400 and turbine 530 designed for small unmanned air vehicle (UAV) propulsion or portable power generation. However, no aspect of the design of the heat exchanger 400 inherently limits its use to engines of this size, or for these particular applications.

Typically, for purposes of UAV propulsion and portable power generation, internal combustion (IC) engines are utilized. In comparison, the gas turbine engine assembly 500 can provide superior reliability, engine life, noise and vibration characteristics, and compatibility with certain fuels, without severely compromising weight and cost. In this example application, the turbines can generate electric power, rather than shaft power, with a direct-drive generator 545. Electric power can be chosen as the output power to enable the engine assembly 500 to be used in a wider range of applications, such as portable power generation, combined heat and power (CHP), and hybrid electric UAV propulsion systems. However, nothing would preclude adding a gearbox in line with the generator shaft to the engine assembly 500 to yield a flexible system that could produce output power in either form.

In general, and known to one of ordinary skill in the art, the gas turbine engine assembly 500 operates by receiving inlet air 505 that is passed through an air filter 510. The incoming air can be traced by following the arrows from the inlet 505. The incoming air is compressed to high pressure by the compressor 515, or other means for compressing air. Next, and in accordance with an exemplary embodiment of the invention, the compressed air (represented by arrows 517) enters the recuperator 400.

As described previously with respect to FIGS. 1-4, the recuperator 400 is configured to allow hot exhaust gases (represented by arrow 519, and other non-labeled arrows) that are radially exiting from the turbine 530 to enter an inlet manifold 130 in the recuperator 400. The inlet manifold 130 disperses the exhaust gases into multiple exhaust channels in the recuperator 400. While passing through the exhaust channels, the heat from the exhaust gases pre-heats the compressed air 517 that is radially passing through air channels in the recuperator 400 inwards towards the combustion volume 525. After passing through the exhaust channels, the exhaust gases 519 enter one or more outlet manifolds 135 and exit the engine assembly 500 via the exhaust ports 540.

The pre-heated compressed air can then enter the combustion volume 525, where fuel injectors can inject a steady stream of fuel. In the high-pressure environment of the combustor 525, combustion of the fuel increases the gas temperature, and the products of combustion are forced into an expander section. The expander can be configured for allowing the products of combustion to produce useful work while expanding. In one embodiment, the expander is a turbine 530 and can be made from a ceramic material. More specifically, the gas flow (i.e., the product of combustion) can be directed over the turbine's blades, causing the turbine 530 to rotate. In an exemplary embodiment of the invention, the turbine 530 can be fabricated from a ceramic material, such as self-reinforced silicon nitride. Such ceramics can tolerate higher temperatures than metals, thereby enabling the engine to operate at higher peak temperatures, and thus to achieve higher fuel efficiency.

As discussed previously, the recuperator 400 is constructed in a segmented annular design. Thus, the recuperator 400 can be placed around the combustor volume 525 and the turbine 530, which can create an insulating effect, as well as reducing thermal stresses. More specifically, the combustor volume 525 and turbine 530 can be positioned in the center of the annular recuperator 400, where the annular recuperator 400 surrounds the combustor volume 525 and the turbine 530. This saves energy by, in effect, insulating the hot gas manifold 130 and other hot components, reducing heat losses to the environment, while also saving weight by reducing the amount of insulation needed. Additionally, the recuperator 400 can reside in a pressure vessel formed by an engine housing 535. This pressure can load the ceramic material in the recuperator 400 substantially in compression, which can help to suppress the growth of any cracks or leaks in the recuperator walls.

Figure 6:
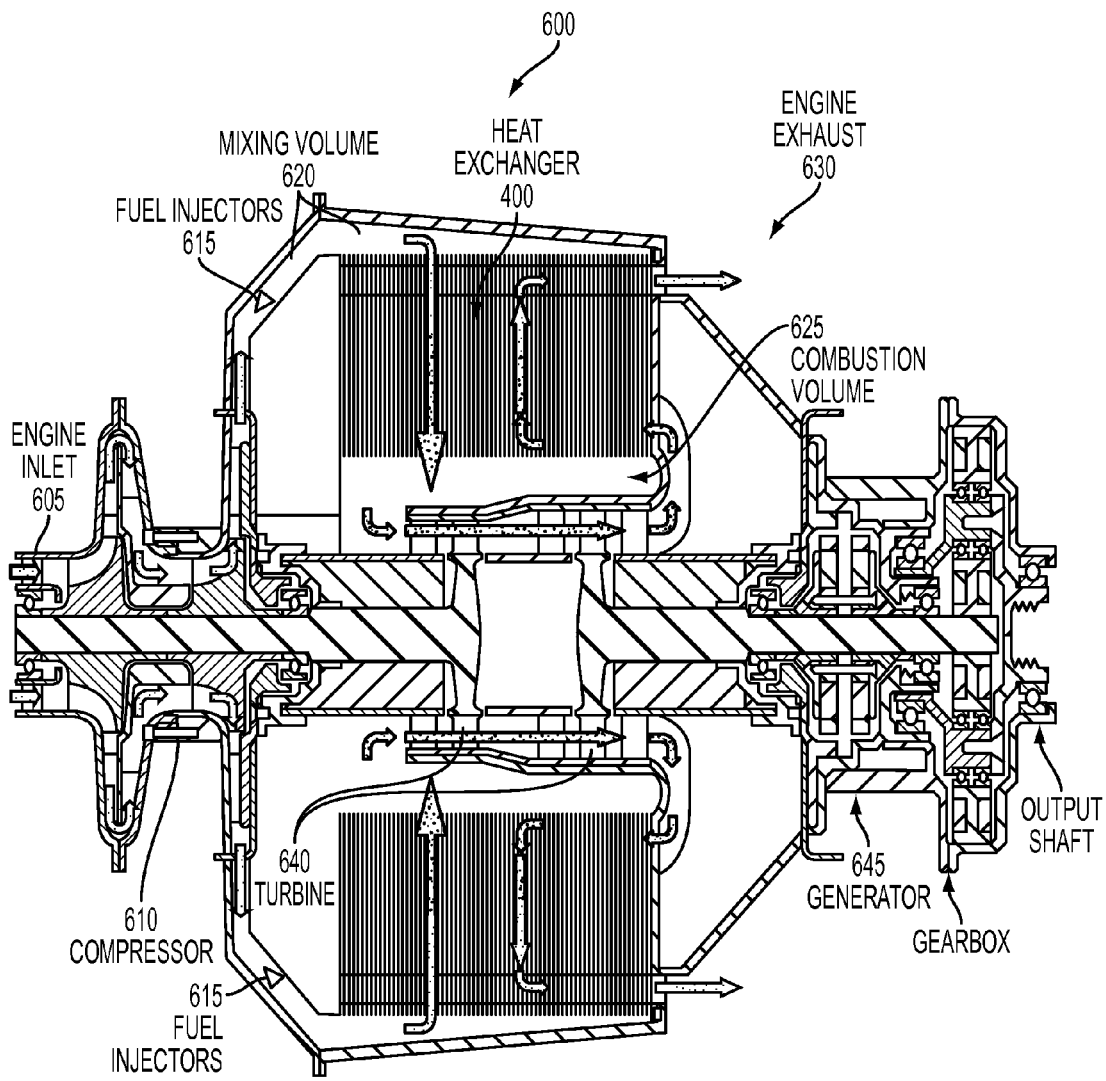
FIG. 6 is a schematic of an engine assembly incorporating a heat recirculating combustor in accordance with an alternative exemplary embodiment of the invention.

FIG. 6 is a schematic of an engine assembly 600 incorporating a compact ultra-lean premixed recuperated combustor, known as a "heat recirculating combustor" (or combustor assembly), in accordance with an alternative exemplary embodiment of the invention. It should be noted that the heat-recirculating combustor assembly could also be useful in a number of different applications unrelated to engines, such as high-temperature burners for industrial applications, and other similar applications. Merely for convenience, the heat-recirculating combustor is described here in the context of an engine assembly.

Here, the heat exchanger 400 is combined with one or more fuel injectors 615 that are placed in an unusual location—upstream from the heat exchanger 400. In contrast, as described in the above text associated with FIG. 5, standard practice would be to place the fuel injectors downstream from the heat exchanger, enabling fuel to be directly injected into the combustion zone. A heat-recirculating combustor such as that depicted schematically in FIG. 6 can generate extremely low levels of pollution, without certain undesirable features (large size and weight; poor combustion stability) of other types of low-emission combustors. Additionally, the combustor can accommodate the unusual combustor requirements for low pressure ratio gas turbine engines that employ an extremely high degree of recuperation. The combustor utilizes the advantageous features of the heat exchanger, as described with respect to FIGS. 1-4, particularly its high effectiveness and its compatibility with ceramic materials, to create a small, lightweight heat recirculating combustor that generates extremely low levels of pollution while maintaining very high flame stability.

Similar to FIG. 5, and known to one of ordinary skill in the art, the exemplary engine assembly 600 operates by receiving inlet air 605 from a source. The inlet air can be traced by following the arrows from the engine inlet 605. The inlet air is compressed to high pressure by the compressor 610, or other means for compressing air. Departing now from the mode of operation for FIG. 5, at or near the compressor 610 outlet, the compressed air can be thoroughly mixed with fuel injected by the fuel injectors 615, upstream from the heat exchanger 400, in a mixing volume 620. In an alternative embodiment, the compressed air can be thoroughly mixed with the injected fuel inside the compressor 610 itself; or, alternatively, upstream of the compressor 610. The means for thoroughly mixing the air and fuel can form a substantially homogeneous mixture of air and fuel vapor. Furthermore, the fuel/air mixture can be produced in sufficiently lean proportions to prevent carbon formation and premature ignition inside the heat exchanger 400, and to limit post-combustion temperatures of the burned gases to a sufficiently low level (nominally less than 1600K) to prevent overheating of the hot section parts, and to keep pollutant generation rates low.

The premixed fuel/air mixture can then enter a compact heat exchanger, such as the recuperator 400 described in FIGS. 1-4, for preheating the reactants before combustion. As described previously, the heat exchanger 400 can be of sufficiently high effectiveness, and having sufficient tolerance of high temperatures, to preheat the fuel/air mixture. More specifically, in this application, the fuel/air mixture must be preheated to above its autoignition temperature, which depends on the type of fuel, the fuel/air ratio, and the pressure inside the combustor (nominally in the 1100-1200K range in this instance). Additionally, the heat exchanger 400 must be made from a material, such as the ceramic material mullite, that can withstand temperatures at least slightly exceeding the preheated mixture temperature, for a long period of time.

In general, a combustion volume (i.e., combustor 625), can be located in the center of the heat exchanger 400, and can be configured to receive the preheated fuel and air mixture downstream of the heat exchanger 400 and allow combustion to occur. A means can be provided for using the hot combustion products to perform a useful function. Additionally, a means can be provided for collecting the used combustion products and supplying them to the heat exchanger 400, so that the waste heat from the used combustion products can provide the energy needed for preheating the incoming fuel and air mixture.

More specifically, the combustion volume 625 can be provided downstream from the heat exchanger 400 to allow sufficient time for the combustion reaction to complete. More specifically, the combustion volume 625 provided downstream from the heat exchanger 400 can be sized to allow sufficient but not excessive residence time for the reaction to complete so that pollutants, which form at relatively slow rates, may be reduced even further. In other words, final pollutant concentrations may be achieved which are lower than the equilibrium concentrations, if the time spent at post-combustion temperatures is short enough.

Next, and similar to the description in FIG. 5, an expander can be configured to allow products of the combustion to expand and produce useful work. This work-producing expansion process can be the useful function for which the products of combustion are used. Specifically, the expander can be a turbine 640, and the combustion products can cause the turbine rotors to rotate, which can generate electric power with a direct-drive generator 645, or alternatively, shaft power via a conventional output shaft. In this example, the gas turbine cycle can be compatible with the above requirements (i.e. a recuperator 400 outlet temperature greater than approximately 1100 K, a turbine inlet temperature less than approximately 1600 K, and a turbine exhaust temperature somewhere between these two points). In an exemplary embodiment of the invention, the turbine 640 can be ceramic, such as a turbine 640 in which the rotors are made from silicon nitride or mullite. Other temperature ranges and other turbine materials can also be utilized.

Additionally, in this particular example, the recuperated gas turbine can operate at a relatively low pressure ratio (nominally less than 4:1), because a low pressure ratio can yield the optimum thermodynamic cycle efficiency; reduces the partial pressure of water vapor in the combustion products (which, if too high, can cause erosion/oxidation of the turbine blades); ensures that the difference between the turbine inlet and turbine outlet temperature will fit within the 1100-1600 K range prescribed above; and reduces the turbine stresses for a given number of stages, thus simplifying the engine while making it last longer. However, other pressure ratios can also be utilized.

It should be understood that the foregoing relates only to illustrative embodiments of the present invention, and that numerous changes may be made therein without departing from the scope and spirit of the invention as defined by the following claims.

The invention claimed is:

1. A heat exchanger, comprising:
a plurality of wafers, each wafer being formed by two or more sheets of material and with peripheral walls between the sheets, the peripheral walls defining one or more interior fluid flow channels between the sheets and one or more exterior fluid flow channels outside the sheets; and
each wafer comprising at least one hole at each end of the wafer extending through the sheets, providing for inlet and outlet holes to the interior fluid flow channels of each wafer;
walls surrounding the inlet and outlet holes positioned in the exterior fluid flow channels outside the sheets; wherein the plurality of the wafers are stacked into sectors with the inlet holes aligned and the outlet holes aligned forming manifolds;
a plurality of the sectors arranged in an annular design, such that the manifolds are oriented substantially axially and the fluid flow channels are oriented substantially radially; and
a pressure vessel assembly that encloses the plurality of wafers and the plurality of sectors arranged in an annular design, and creates a pressure that loads the material predominantly in compression.

2. The heat exchanger of claim 1, wherein the sheets of material are ceramic.

3. The heat exchanger of claim 2, wherein the ceramic material is mullite.

4. The heat exchanger of claim 1, wherein the wafers or complete stacks of wafers are formed by cutting sheets of ceramic material, laminating the sheets of ceramic material together, and then co-sintering the laminated sheets.

5. The heat exchanger of claim 1, wherein the fluid flowing in the interior channels is at a lower pressure than the fluid flowing in the exterior channels.

6. The heat exchanger of claim 1, wherein the temperature of the fluid flowing in the radially outward direction is generally decreasing, and the temperature of the fluid flowing in the radially inward direction is generally increasing.

7. The heat exchanger of claim 1, wherein the interior fluid flow channels are exhaust channels and the exterior fluid flow channels are air channels.

8. The heat exchanger of claim 1, wherein at least a portion of the manifold walls is made from an elastomeric material.

9. An engine assembly, comprising:
a compressor configured for compressing inlet air;
a heat exchanger configured to preheat the compressed inlet air; the heat exchanger comprising:
a plurality of wafers, each wafer being formed by two or more sheets of material and with peripheral walls between the sheets, the peripheral walls defining one or more interior fluid flow channels between the sheets and one or more exterior fluid flow channels outside the sheets; and each wafer comprising at least one hole at each end of the wafer extending through the sheets, providing for inlet and outlet holes to the interior fluid flow channels of each wafer;
walls surrounding the inlet and outlet holes positioned in the exterior fluid flow channels outside the sheets; wherein the plurality of the wafers are stacked into sectors with the inlet holes aligned and the outlet holes aligned forming manifolds;
a plurality of the sectors arranged in an annular design, such that the manifolds are oriented substantially axially and the fluid flow channels are oriented substantially radially;
a pressure vessel assembly that encloses the plurality of wafers and the plurality of sectors arranged in an annular design, and creates a pressure that loads the material predominantly in compression; and
a combustor, located in the center of the heat exchanger, configured to receive the preheated compressed air from the heat exchanger and an injected fuel from one or more fuel injectors located downstream from the heat exchanger and to allow combustion of the injected fuel to occur.

10. The engine assembly of claim 9, further comprising an expander, wherein the expander is configured to allow products of the combustion to produce useful work while expanding.

11. The engine assembly of claim 10, wherein the expander is a turbine.

12. The engine assembly of claim 11, wherein the turbine is made from a ceramic material.

13. The engine assembly of claim 9, wherein the heat exchanger preheats the compressed inlet air by receiving used combustion products from the combustor, wherein the used combustion products supply energy needed for preheating the compressed inlet air.

14. A combustor assembly, comprising:
a source of inlet air;
a mixing volume configured to thoroughly mix the inlet air with fuel injected by one or more fuel injectors, upstream from a heat exchanger;
the heat exchanger configured to preheat the fuel and air mixture; the heat exchanger comprising:
a plurality of wafers, each wafer being formed by two or more sheets of material and with peripheral walls between the sheets, the peripheral walls defining one or more interior fluid flow channels between the sheets and one or more exterior fluid flow channels outside the sheets; and each wafer comprising at least one hole at each end of the wafer extending through the sheets, providing for inlet and outlet holes to the interior fluid flow channels of each wafer;
walls surrounding the inlet and outlet holes positioned in the exterior fluid flow channels outside the sheets; wherein the plurality of the wafers are stacked into sectors with the inlet holes aligned and the outlet holes aligned forming manifolds;
a plurality of the sectors arranged in an annular design, such that the manifolds are oriented substantially axially and the fluid flow channels are oriented substantially radially;
a pressure vessel assembly that encloses the plurality of wafers and the plurality of sectors arranged in an annular design, and creates a pressure that loads the material predominantly in compression; and
a combustor, located in the center of the heat exchanger, configured to receive the preheated fuel and air mixture downstream of the heat exchanger and allow combustion to occur.

15. The combustor assembly of claim 14, further comprising:
- a compressor configured to compress air, and supply the compressed air to the combustor; and
- an expander configured to allow products of the combustion to expand and produce useful work.

16. The combustor assembly of claim 15, wherein the expander is a turbine.

17. The combustor assembly of claim 16, wherein the turbine is made from a ceramic material.

18. The combustor assembly of claim 14, wherein the fuel and air mixture is a substantially homogeneous mixture of air and fuel vapor, produced in sufficiently lean proportions to prevent carbon formation and premature ignition inside the heat exchanger.

19. The combustor assembly of claim 15, wherein the fuel and air mixture is thoroughly mixed inside the compressor.

20. The combustor assembly of claim 14, wherein the heat exchanger is configured to preheat the fuel and air mixture above its autoignition temperature.

21. The combustor assembly of claim 14, wherein the heat exchanger preheats the fuel and air mixture by receiving used combustion products from the combustor, wherein the used combustion products supply energy needed for preheating the incoming fuel and air mixture.

* * * * *